UNITED STATES PATENT OFFICE.

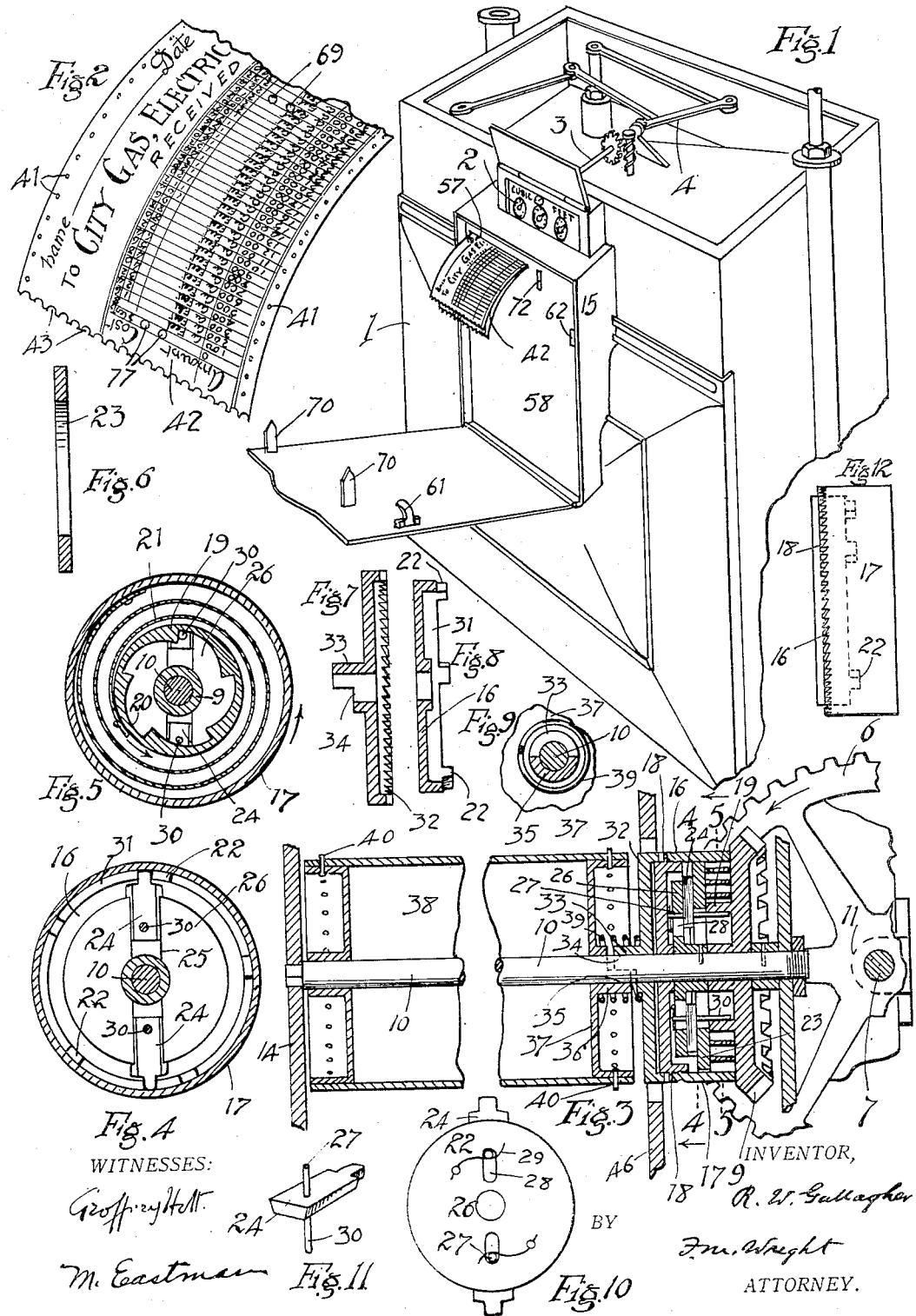

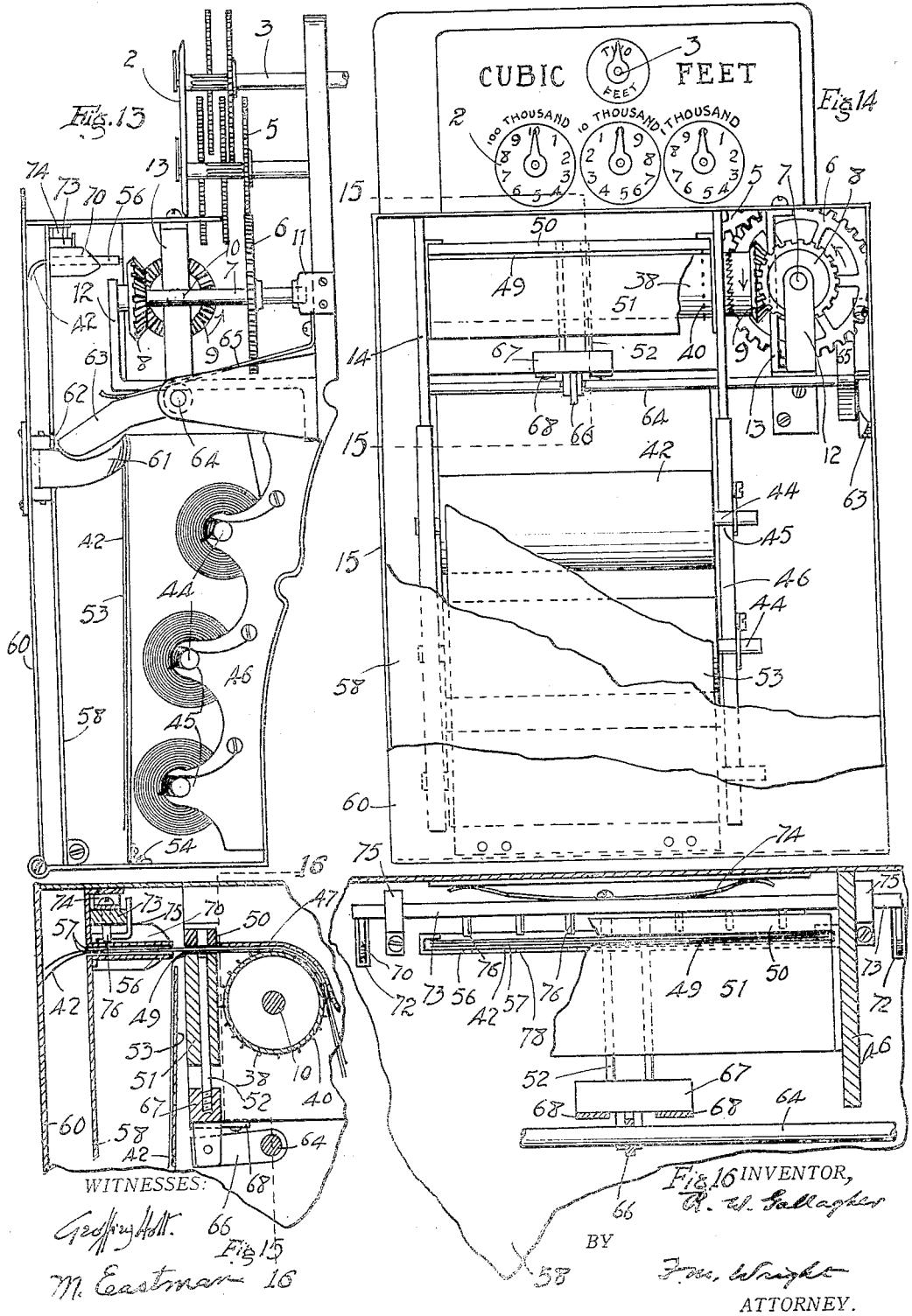

RICHARD W. GALLAGHER, OF LOS ANGELES, CALIFORNIA, ASSIGNOR TO AUTOMATIC BILLING COMPANY, OF LOS ANGELES, CALIFORNIA, A CORPORATION OF CALIFORNIA.

STATEMENT-DELIVERY APPARATUS FOR METERS.

No. 924,158.　　　Specification of Letters Patent.　　　Patented June 8, 1909.

Application filed November 20, 1907. Serial No. 402,952.

*To all whom it may concern:*

Be it known that I, RICHARD WILLIAM GALLAGHER, a citizen of the United States, residing at Los Angeles, in the county of Los Angeles and State of California, have invented new and useful Improvements in Statement-Delivery Apparatus for Meters, of which the following is a specification.

This invention relates to apparatus for delivering statements from meters, such as gas meters, electric meters, or the like, the object of the invention being to provide an apparatus by means of which a complete statement, in duplicate, in triplicate or in greater number if desired may be obtained at any time of the amount of gas, electricity or other measured commodity consumed and also of the cost to the consumer of said commodity; and which will present such a statement of the cost as well as the amount whatever may be the price at which the commodity is charged.

For the sake of illustration, I have herein shown the apparatus as used in connection with a gas meter, but it is to be understood that my apparatus can be used equally well with other meters such as electric meters, taximeters, or any other meters which automatically measure the magnitude of the service rendered.

In the accompanying drawing, Figure 1 is a perspective view of a gas meter having my device attached thereto; Fig. 2 is an enlarged perspective view of a portion of a statement used with said device; Fig. 3 is a broken longitudinal sectional view of a feed roller and mechanism for advancing the same; Fig. 4 is a transverse section of the line 4—4 of Fig. 3, looking to the left; Fig. 5 is a transverse section of the line 5—5 of Fig. 3, looking to the left; Fig. 6 is a sectional view of the washer; Fig. 7 is a similar view of the ratchet disk; Fig. 8 is a similar view of the cylinder disk, detached; Fig. 9 is a detail section through the shaft of the feed roller; Fig. 10 is a side view of the fixed disk carrying the dogs; Fig. 11 is a perspective view of one of said dogs detached; Fig. 12 is a side view of the ratchet cylinder; Fig. 13 is a side view of the apparatus detached, an end casing being removed; Fig. 14 is a broken front view of the same; Fig. 15 is an enlarged vertical transverse section on the line 15—15 of Fig. 14; Fig. 16 is an enlarged broken longitudinal section of the line 16—16 of Fig. 15.

In the accompanying drawing, 1 indicates the casing of a gas meter, having the usual series of indicating dials 2, and train of gearing for actuating said dials, driven by a shaft 3, (Figs. 1, 13) in the usual manner from the meter mechanism 4. Said train comprises a gear wheel 5 with which meshes a gear wheel 6 on a shaft 7, (Figs. 13, 14) upon which is also secured a bevel gear 8, which meshes with a bevel gear 9 loosely rotating on a fixed shaft 10. The shaft 7 rotates in bearings in brackets 11, 12, the bracket 11 being extended as shown at 13, to carry, fixed therein, one end of the shaft 10. The other end of said shaft 10 is fixed in a side plate 14 (Fig. 3) secured within the casing 15, (Figs. 14, 16) of the delivery mechanism. Upon said shaft 10 is also rotatably mounted a disk 16 having a crown flange 31 (Figs. 8, 12) secured by crimping to a cylinder 17, (Fig. 12) the smooth end of which abuts against the rear side of the bevel gear 9, (Fig. 3) while the other end is formed with ratchet teeth thus forming a ratchet wheel 18 at said end.

The following means are provided whereby, from a continuous movement of the bevel gear 9, imparted thereto by the meter, an intermittent movement is imparted to said wheel 18. The bevel gear 9 is formed at its rear side with a concentric circular flange 19, (Figs. 3, 5) formed with five internal cam surfaces 20, and to said flange 19 is attached the inner end of a coiled spring 21, its outer end being attached to the cylinder 17. To prevent the continuous rotation of the ratchet wheel 18 with the bevel gear 9, the crown flange of the disk 16 is formed, on the inside of the cylinder 17, with five equi-distant lugs 22, (Figs. 4, 8,). Between these lugs and the flange 19 is interposed a washer 23, which retains in place the spring 21. These lugs 22 are adapted to be engaged by the ends of two alternately acting dogs 24 which slide in undercut radial grooves 25 formed diametrically in a disk 26 fixed upon the shaft 10. Since these dogs are diametrically opposite to each other, it results that when the end of one dog engages a lug 22, the end of the other dog is disengaged between two other of said lugs. It is by reason of the engagement of one or the other of said dogs with one of said lugs, that the ratchet wheel 18 is normally prevented from rotating with the gear 9. In order to insure such engagement each dog has a laterally extending pin 27, (Figs. 3, 10) passing through a radial slot 28 formed in the disk 26, the projecting end of which pin 27 is engaged by a small spring 29 to project the dog 24 radially outward. But each dog has also a pin 30 which extends from its other side through the central hole of the washer 23, (Fig. 3) and into the inside of the cam flange 19, its projecting end being thus, by means of its spring 29, pressed against the inner or cam surface 20 of said flange. Therefore, as the bevel gear 9 rotates, one of said cam surfaces 20 gradually presses the corresponding pin 30 inward, until the outer end of its dog is completely withdrawn from the lug 22 engaged thereby, whereupon the ratchet wheel 18 is free to rotate, which it immediately does under the action of the coiled spring 21 which has been wound up by the rotation of the bevel gear 9. The other one of the pair of dogs 24 which was heretofore free between two lugs 22 now engages one of said lugs, so that the ratchet wheel 18 is again arrested, after it has made only one-tenth of a revolution.

It may be here stated that the number of lugs 22 and also of cam surfaces 20 is not necessarily five each, but may be any other number desired, according to the distance that it is required to move the ratchet wheel 18 at one movement, which is determined by an advance to be given to the statement sheets through a distance indicated on the paper corresponding to the consumption of 100 feet of gas as measured by the meter, or correspondingly for other than gas meters.

The ratchet wheel 18 engages a crown ratchet wheel 32, (Fig. 7) which has a sleeve 33 rotating on the fixed shaft and cut away at 34 to form a tooth and notch engaging a similar notch and tooth 35 (Figs. 3, 9) on the hub 36 of the end 37 of the feed roller 38, so that said roller and the ratchet wheel 32 always rotate in unison. Between the ratchet wheel 32 and said end 37 is a coiled spring 39, which normally holds the ratchet wheel 32 in engagement with the ratchet wheel 18. Said feed roller 38 is formed at each end with a circular series of pins 40, which are adapted to enter holes 41 previously perforated in the margins of statement sheets 42, of which there may be any desired number, three being here shown.

By transverse lines of perforations, partly shown at 43, (Fig. 2,) each statement sheet is divided into sections, each containing a single statement, and said sheets are wound on supply rollers 44, the ends of which are removably mounted in bearings 45 formed in side plates 14 and 46. Above the feed roller 38 is mounted a guide 47 (Fig. 15) which insures the engagement of the feed holes 41 in the statement sheets with the pins 40 on the feed roller. After leaving said feed roller, said statement sheets pass through a horizontal slot 49 formed between a die 50 and a punch guide 51, through which latter can move vertical punch pins 52, actuated as hereinafter described. They then pass over the upper edge of a plate 53, hinged to the delivery casing at the bottom, as shown at 54, which plate normally covers said supply rollers. The innermost of these sheets then passes down over said plate, to be retained in the casing, while the upper or outer sheets pass over a shelf 56 and through a slot 57 formed in an inner cover 58. In front of said inner cover is an outer cover 60, both of said covers being hinged at the bottom to the casing. The outer cover has, extending inwardly from one of its edges, an arm 61, (Figs. 1, 13) which passes through a recess 62 formed in the edge of the inner cover, and is adapted to engage the under side of an arm 63 extending from a rock shaft 64, said arm 63 being depressed by a spring 65. Upon said rock shaft is an arm 66 (Figs. 14, 15, 16) which extends outward, and has attached to its end a block 67 to which are secured the punch pins 52, said block being limited in its downward movement by stops 68. Therefore the opening of the outer cover 60 immediately causes the pins 52 to move upward to punch holes 69 (Fig. 2) in the statement sheets, which holes 69 indicate the extent to which the sheets had been at that time advanced. Immediately thereafter arms 70, extending inward from the inner side of said outer cover through suitable holes 72 of the inner cover 58, are withdrawn from below the ends of a stop bar 73 (Figs. 15, 16) depressed by a bow spring 74, and the outer ends of which are guided in bearings 75, which stop bar carries downwardly extending stop pins 76. When the outer cover is opened these stop pins drop upon the statement sheets, the result being, that, when the said statement sheets are then withdrawn by hand, they can pass under said pins until the inner ends of the outer or first sections thereof arrive at said pins, whereupon said pins, assisted by the spring 74, drop through certain of the holes 43, (Fig. 2) dividing each first section from the remainder of the sections, and into holes 78 in the shelf 56, shown in dotted lines in Fig. 16, so that the parts of the statement sheets following the first sections are effectually arrested, and then said outer or first sections, if force is still applied thereto, are torn off from the remainder.

When the outer door is again closed, the punch pins punch holes 77 (Fig. 2) in the statement sheets, which holes 77 should then be in the parts of said sheets indicating that there has been no consumption of gas or other commodity, and the presence and position of these holes 77 will be evidence of the correctness of the statement next rendered.

When the bill collector withdraws all except the lowermost sheet by hand, the movement of said sheets rotates the feed roller 38, which therefore advances also the lowermost sheet, which still remains in the casing. Although the ratchet wheel 18 is prevented rotating by reason of the engagement of one of the lugs 22 with one of the dogs 23, yet this does not prevent this movement of the feed roller by hand for the teeth of the ratchet wheel 32 slip past the teeth of the ratchet wheel 18, slightly compressing the coiled spring 39.

When the first sections of the sheets have been torn from the remainder, as described, the coiled spring 39 immediately causes the ratchet wheels 32 and 18 to reëngage each other, and, upon closing the door, the pins 76 are withdrawn from the statement sheets so that they can again advance intermittently with the motion of the meter. This intermittent advance is an important feature of the invention. Although the meter mechanism may be continuously actuated by the passage of gas, or the supply of other commodity, no motion is imparted to the feed roller until the meter mechanism has been operated to an extent corresponding to the supply of one of a series of predetermined quantities of the commodity, as, for instance, in the case of gas, until the amount of gas supplied has reached an exact number of hundreds of cubic feet, and similar provision can be made for the supply of electricity, transportation, or the like. The importance of this arrangement is due to the necessity that the holes punched in the statement sheets may always have a corresponding or similar relative location to some one of the cross lines of the statement sheet indicating the amount and cost of consumption. On the one hand these holes must be sufficiently large to be easily discernible, and, on the other hand, the space between two such successive indicating lines of the statement sheets is necessarily limited, in order to keep the size of each statement within reasonable limits. If then the feed roller moved continuously in unison with the meter mechanism, it would often happen that the punched holes would be on or about the dividing part between cross lines indicating two different amounts. This would lead to uncertainty and disputes as to the charge to be collected. At the same time, just as at present in the case of making out bills for gas, the fraction of one hundred cubic feet which was left over and not charged for in one statement would be added to the amount consumed before the next statement was rendered, and would therefore be included in the next statement.

I claim:—

1. In a statement delivery mechanism for meters, the combination of mechanism adapted to measure a commodity and continuously deliver a supply thereof for immediate consumption, a support for a roll of paper, permitting the outer end of said roll to be free and detachable, means for advancing the outer or front end of the roll of paper on said support, and an operative connection between said mechanism and advancing means, whereby the operation of the latter is proportionately controlled by the movement of the former, said connection permitting the advancing means to operate to permit the paper to advance independently of said mechanism, substantially as described.

2. In a statement delivery mechanism for meters, the combination of mechanism adapted to measure a commodity and continuously deliver a supply thereof for immediate consumption, a support for a roll of paper, permitting the outer end of said roll to be free and detachable, means for advancing the outer or front end of the roll of paper on said support, and an operative connection between said mechanism and advancing means, for proportionately operating the latter by the movement of the former, said connection permitting the advancing means to operate to permit the paper to advance independently of the movement of said mechanism, substantially as described.

3. In a statement delivery mechanism for meters, the combination of mechanism adapted to measure a commodity and continuously deliver a supply thereof for immediate consumption, a support for a roll of paper, permitting the outer end of said roll to be free and detachable, means for advancing the outer or front end of the roll of paper on said support, and an operative connection between said mechanism and advancing means, whereby the operation of the latter is proportionately controlled by the movement of the former, means for voluntarily marking selectively as to time, the paper at a uniform point in its path, whereby said mark indicates the amount of advance at said time, and means for normally holding said marking means out of operation, substantially as described.

4. In a statement delivery mechanism for meters, the combination of mechanism adapted to measure a commodity and continuously deliver a supply thereof for immediate consumption, a support for a roll of paper, permitting the outer end of said roll to be free and detachable, means for advancing the outer or front end of the roll of paper on said support, and an operative connection between said mechanism and advancing means, whereby the operation of the latter is proportionately controlled by the movement of the former, means for voluntarily marking selectively as to time, the paper at a uniform point in its path, whereby said mark indicates the amount of advance at said time, means for normally holding said marking means out of operation, and means, adapted to operate only when the paper has been advanced through a certain distance, to retain the remainder of the paper, substantially as described.

5. In a statement delivery mechanism for meters, the combination of mechanism adapted to measure a commodity and continuously deliver a supply thereof for immediate consumption, a roller for carrying paper so that said paper has one end free and detachable, said paper having thereon uniformly spaced indicating marks, a support for said roller, means, controlled by the movement of the meter, for advancing the free end of said paper through one such space at a time, and means for marking said paper at will at a fixed point in its path, substantially as described.

In testimony whereof I have hereunto set my hand in the presence of two subscribing witnesses.

RICHARD W. GALLAGHER.

Witnesses:
FRANCIS M. WRIGHT,
D. B. RICHARDS.